US011888230B1

(12) United States Patent
Jensen et al.

(10) Patent No.: US 11,888,230 B1
(45) Date of Patent: Jan. 30, 2024

(54) ANTENNA ASSEMBLY INCLUDING FEED SYSTEM HAVING A SUB-REFLECTOR

(71) Applicant: Space Exploration Technologies Corp., Hawthorne, CA (US)

(72) Inventors: Anders Jensen, Beaux Arts, WA (US); Jinfay Yuan, Parsippany, NJ (US); Sean Holt, Seattle, WA (US); Samuel T. Reineman, Kirkland, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/825,993

(22) Filed: May 26, 2022

Related U.S. Application Data

(60) Provisional application No. 63/194,147, filed on May 27, 2021.

(51) Int. Cl.
*H01Q 19/19* (2006.01)
*H01Q 13/02* (2006.01)

(52) U.S. Cl.
CPC ........... *H01Q 19/193* (2013.01); *H01Q 13/02* (2013.01)

(58) Field of Classification Search
CPC ....... H01Q 19/193; H01Q 13/02; H01P 5/103
See application file for complete search history.

(56) References Cited

U.S. PATENT DOCUMENTS 2,307,011 A * 1/1943 Barrow .................. H01Q 1/247 342/350
2,429,640 A * 10/1947 Mieher ................... H01P 5/024 343/822
3,241,147 A * 3/1966 Morgan ............... H01Q 19/025 343/837
5,793,334 A * 8/1998 Anderson ................ H01Q 5/47 343/785
5,907,309 A * 5/1999 Anderson ................ H01Q 5/47 333/248
5,959,590 A * 9/1999 Sanford ............... H01Q 19/021 343/781 R
6,097,154 A * 8/2000 Choi ....................... H01J 23/54 315/39.53
6,107,973 A * 8/2000 Knop ..................... H01Q 19/19 343/781 CA (Continued)

FOREIGN PATENT DOCUMENTS

CN 217983657 U * 12/2022
EP 3355419 A1 * 8/2018 ................ H01P 3/16

(Continued)

*Primary Examiner* — Dimary S Lopez Cruz
*Assistant Examiner* — Jordan E. DeWitt
(74) *Attorney, Agent, or Firm* — Polsinelli PC

(57) ABSTRACT

In one embodiment, a parabolic antenna assembly includes a main reflector, a feed system in RF communication with the main reflector including a horn and a dielectric portion, and a sub-reflector in RF communication with the feed assembly, wherein the sub-reflector includes a body portion and a stem portion mechanically coupled to one another, wherein a reflecting surface of the sub-reflector is defined by at least a portion of the body portion and at least a portion of the stem portion, wherein the dielectric portion spaces the sub-reflector from the horn, and wherein the sub-reflector includes an axially-symmetric choke for providing virtual continuity at the reflecting surface.

19 Claims, 6 Drawing Sheets

(56) References Cited

U.S. PATENT DOCUMENTS 6,137,449 A * 10/2000 Kildal ...................... H01Q 1/42 343/781 CA
6,208,309 B1 * 3/2001 Chandler ........... H01Q 13/0216 343/781 R
6,982,679 B2 * 1/2006 Kralovec ........... H01Q 13/0208 343/781 CA
7,075,492 B1 * 7/2006 Chen .................... H01Q 19/134 343/781 R
9,246,233 B2 * 1/2016 Mahon ................... H01Q 19/19
9,634,400 B2 4/2017 Zelenski et al.
9,742,069 B1 * 8/2017 Hollenbeck ........ H01Q 13/0208
2005/0062663 A1 * 3/2005 Hills .................. H01Q 13/0216 343/781 CA
2005/0099350 A1 * 5/2005 Gothard ............... H01Q 19/193 343/781 CA
2006/0158371 A1 * 7/2006 Duivenvoorden ...... H01P 5/103 73/290 R
2013/0057444 A1 * 3/2013 Brandau ................ H01Q 19/19 343/781 CA
2015/0091769 A1 * 4/2015 Zelenski ............ H01Q 13/0208 343/781 CA
2016/0126638 A1 * 5/2016 Brandau .............. H01Q 19/193 343/781 CA
2017/0231696 A1 * 8/2017 Williams ........... A61B 18/1815 606/33
2017/0310055 A1 * 10/2017 Holland ................. H01R 24/40
2020/0280135 A1 * 9/2020 Biancotto ................ H01Q 5/10
2020/0403312 A1 * 12/2020 Guan ..................... H01Q 19/19
2021/0376480 A1 * 12/2021 Brandau ................ H01Q 13/06

FOREIGN PATENT DOCUMENTS

ES 2707900 B2 * 7/2019 ............... H01Q 1/52
WO WO-2018057824 A1 * 3/2018 .............. H01P 1/161
WO WO-2019216935 A2 * 11/2019 ............. H01Q 13/06
WO WO-2022137364 A1 * 6/2022

* cited by examiner

ANTENNA ASSEMBLY INCLUDING FEED SYSTEM HAVING A SUB-REFLECTOR

CROSS-REFERENCE TO RELATED APPLICATIONS

This application claims priority to U.S. Provisional Application No. 63/194,147, filed on May 27, 2021, entitled "ANTENNA ASSEMBLY INCLUDING FEED SYSTEM HAVING A SUB-REFLECTOR", the contents of which are incorporated herein in their entirety and for all purposes.

TECHNICAL FIELD

The present technology pertains to a feed assembly and a sub-reflector and more specifically to a dual-reflector system having a feed assembly and sub-reflector in a parabolic antenna system.

BACKGROUND

Parabolic antennas can be used as high-gain antennas for point-to-point communications. Suitable applications may include microwave relay links to carry telephone and television signals between nearby cities, wireless wide area network (WAN) and local area network (LAN) links for data communications, satellite communications, spacecraft communication antennas, and in radio telescopes.

In parabolic antenna design, certain components may be attached using adhesive at certain bonding points. However, reliance on such bonded joints can add burdensome process control requirements to assembly of the antenna, such as storage, substrate preparation for the bonding material, dispensing of the bonding material, curing, proof loading and disposal. Moreover, while such adhesive may be suitable for terrestrial applications, it may not be suitable under the extreme temperature swings and/or subject to extreme vibrations during launch, as experienced by antenna assemblies on satellites. Accordingly, there is a need for improved antenna assemblies.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a parabolic antenna assembly is provided. The assembly may include: a main reflector; a feed system in RF communication with the main reflector including a horn and a dielectric portion; and a sub-reflector in RF communication with the feed assembly, wherein the sub-reflector includes a body portion and a stem portion mechanically coupled to one another, wherein the reflecting surface of the sub-reflector is defined by at least a portion of the body portion and at least a portion of the stem portion, wherein the dielectric portion spaces the sub-reflector from the horn, and wherein the sub-reflector includes an axially-symmetric choke for providing virtual continuity at the reflecting surface.

In accordance with another embodiment of the present disclosure, a parabolic antenna assembly is provided. The assembly may include: a main reflector; a feed system in RF communication with the main reflector including a horn and a dielectric portion; and a sub-reflector in RF communication with the feed assembly, wherein the sub-reflector includes a body portion and a stem portion mechanically coupled to one another, wherein the reflecting surface of the sub-reflector is defined by at least a portion of the body portion and at least a portion of the stem portion, wherein the dielectric portion spaces the sub-reflector from the horn, and wherein the sub-reflector includes an axially-symmetric choke for providing virtual continuity at the reflecting surface, wherein the axially-symmetric choke includes a first axial choke portion and a second radial choke portion having a combined length of approximately $\lambda/2$ +/− up to 20% or +/− up to 30%, wherein $\lambda$ is a wavelength of an electromagnetic signal, wherein the first choke portion has a length of approximately $\lambda/4$ +/− up to 20% or +/− up to 30% and the second choke portion has a length of approximately $\lambda/4$ +/− up to 20% or +/− up to 30%.

In any of the embodiments described herein, at least a portion of the stem portion of the sub-reflector may be disposed within the dielectric portion.

In any of the embodiments described herein, the body portion and the stem portion of the sub-reflector may be mechanically coupled by one or more of a screw, a snap fit, or an interference fit.

In any of the embodiments described herein, at least one of the body portion and the stem portion of the sub-reflector may include an internal bore for mechanical coupling.

In any of the embodiments described herein, the assembly may further include a bobbin disposed within the feed system and configured to support the stem portion of the sub-reflector.

In any of the embodiments described herein, the reflecting surface of the sub-reflector may be made from metal.

In any of the embodiments described herein, the body portion and the stem portion, when coupled, may be configured to provide a conductive path there-between.

In any of the embodiments described herein, the stem portion may have a first end in contact with a first portion of the second end of the body portion.

In any of the embodiments described herein, the second end of the body portion may include an extending section in contact with the first end of the stem portion.

In any of the embodiments described herein, the dielectric portion may have a first end in contact with a second portion of the second end of the body portion of the sub-reflector.

In any of the embodiments described herein, the dielectric portion may include an internal collar at the first end defining an opening therein.

In any of the embodiments described herein, an extending portion of the body portion may be received within the opening in the dielectric portion.

In any of the embodiments described herein, the stem portion may have a first end in contact with the collar at the first end of the dielectric portion and the extending portion of the body portion.

In any of the embodiments described herein, the axially-symmetric choke may include a first choke portion and a second choke portion.

In any of the embodiments described herein, the axially-symmetric choke may have a combined length of approximately $\lambda/2$ +/− up to 20% or +/− up to 30%, wherein $\lambda$ is a wavelength of an electromagnetic signal.

In any of the embodiments described herein, the first choke portion may be an axial choke portion and the second choke portion may be a radial choke portion.

In any of the embodiments described herein, the first choke portion may have a length of approximately λ/4 +/− up to 20% or +/− up to 30%, wherein λ is a wavelength of an electromagnetic signal.

In any of the embodiments described herein, the second choke portion may have a length of approximately λ/4 +/− up to 20% or +/− up to 30%, wherein λ is a wavelength of an electromagnetic signal.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
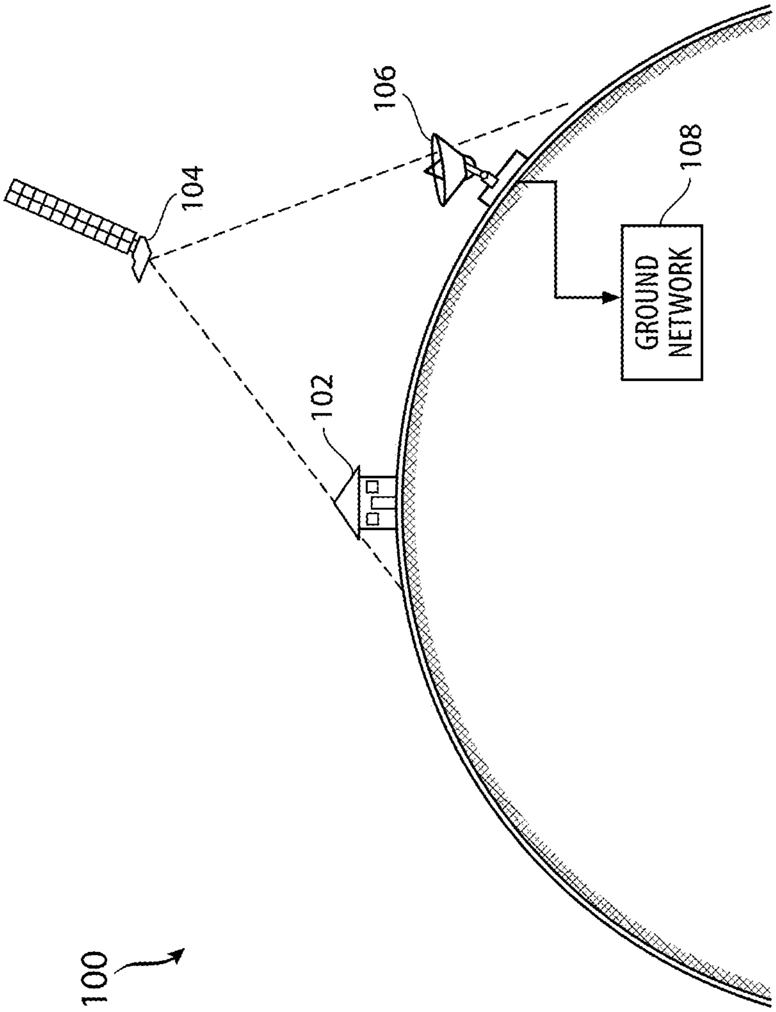
FIG. 1 depicts a not-to-scale schematic view of a simple example of communication in a satellite communication system.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Referring to FIGS. 1-5, embodiments of the present disclosure are directed to parabolic antenna assemblies, including a parabolic reflector and a feed system including a waveguide and a dielectric supported sub-reflector.

Systems are currently being deployed to provide communication via constellations of satellites that communicate with ground stations. FIG. 1 is a not-to-scale schematic diagram that illustrates an example of communication in a satellite network 100. An endpoint or user terminal 102 can be installed at a house, a business, a vehicle, or another location to achieve communication with a satellite 104. The satellite 104, in turn, establishes communication with a gateway terminal 106. The satellite 104 may also establish communication with another satellite (not shown) prior to communication with the gateway terminal 106. The gateway terminal 106 is physically connected via fiber optic, Ethernet, or another physical connection to a ground network 108. The ground network 108 may be any type of network, including the Internet or any other network type.

Other satellites in addition to the satellite 104 can be deployed in the satellite network 100 to expand the coverage to additional user terminals 102. In this manner, individual users deploying user terminals 102 can obtain high-speed access to the ground network 108 without a wired connection.

Embodiments of the present disclosure may relate to antenna assemblies that are configured within the network 100, for example, in the satellite 104, the user terminal 102, or the gateway terminal 106 and to a particular type of parabolic antenna assembly which includes a dual-reflector configuration, for example, including a parabolic reflector and a feed system including a sub-reflector. Although shown as a communication network 100 in FIG. 1, the embodiments of the present disclosure may be applied to any antenna assembly having a dual-reflector configuration, regardless of the use of the antenna assembly.

Figure 2A:
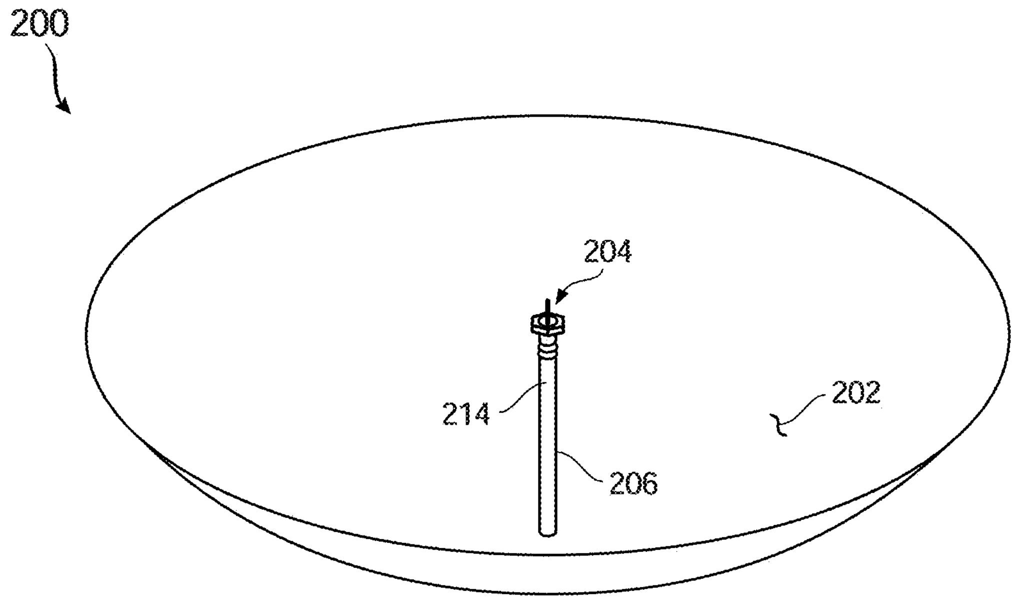
FIG. 2A is an isometric view of an antenna assembly in accordance with embodiments of the present disclosure.
Figure 2B:
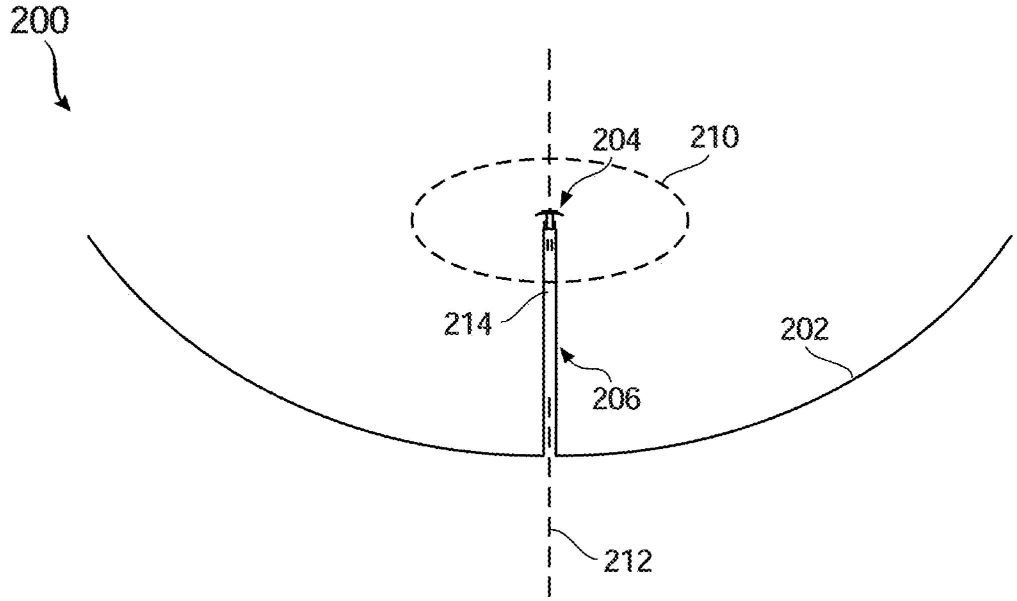
FIG. 2B is a side view of the antenna assembly of FIG. 2A, wherein a parabolic reflector of the antenna assembly is shown in cross-section.

FIGS. 2A and 2B are schematic drawings illustrating an exemplary dual-reflector parabolic antenna assembly 200 including a parabolic reflector 202 and a feed system 206 including a sub-reflector 204. Such an antenna assembly 200 can be called a dual-reflector or Cassegrain antenna. The "dual" or two reflectors in the antenna assembly 200 include the first parabolic reflector 202 and the second smaller sub-reflector 204. The feed system 206 is mounted at or near the surface of the concave main reflector 202 and is in direct radio communication with smaller secondary sub-reflector 204 located in front of the main reflector 202.

A parabolic reflector 202 in a parabolic antenna assembly 200 may be designed to have a specific shape for desired communication. For example, different parabolic reflector shapes include a dish shaped like a paraboloid truncated in a circular rim, a shrouded dish, a cylindrical design curved in one direction and flat in the other, and other shaped reflectors.

The feed system 206 includes a horn 214 and sub-reflector assembly 204 (also described herein as a sub-reflector 204), wherein the horn 214 is used to communicate signals to and from the sub-reflector assembly 204. The radiation pattern of the feed system 206 is tailored to the shape of the main reflector 202 for aperture efficiency, which determines antenna gain. The presence of a sub-reflector 204 as a second reflecting surface in the signal path allows additional tailoring of the radiation pattern for maximum performance. For example, in "dual reflector shaping" the shape of the sub-reflector 204 is altered to direct more signal power to outer areas of the main reflector 202, resulting in more uniform illumination of the primary reflector 202, to maximize the gain, increase the focal length of the antenna, and reduce side lobes, among other advantages. As a non-limiting example, the sub-reflector 204 may be a hyberboloid, which may be contoured for desired radiation patterns.

Figure 3:
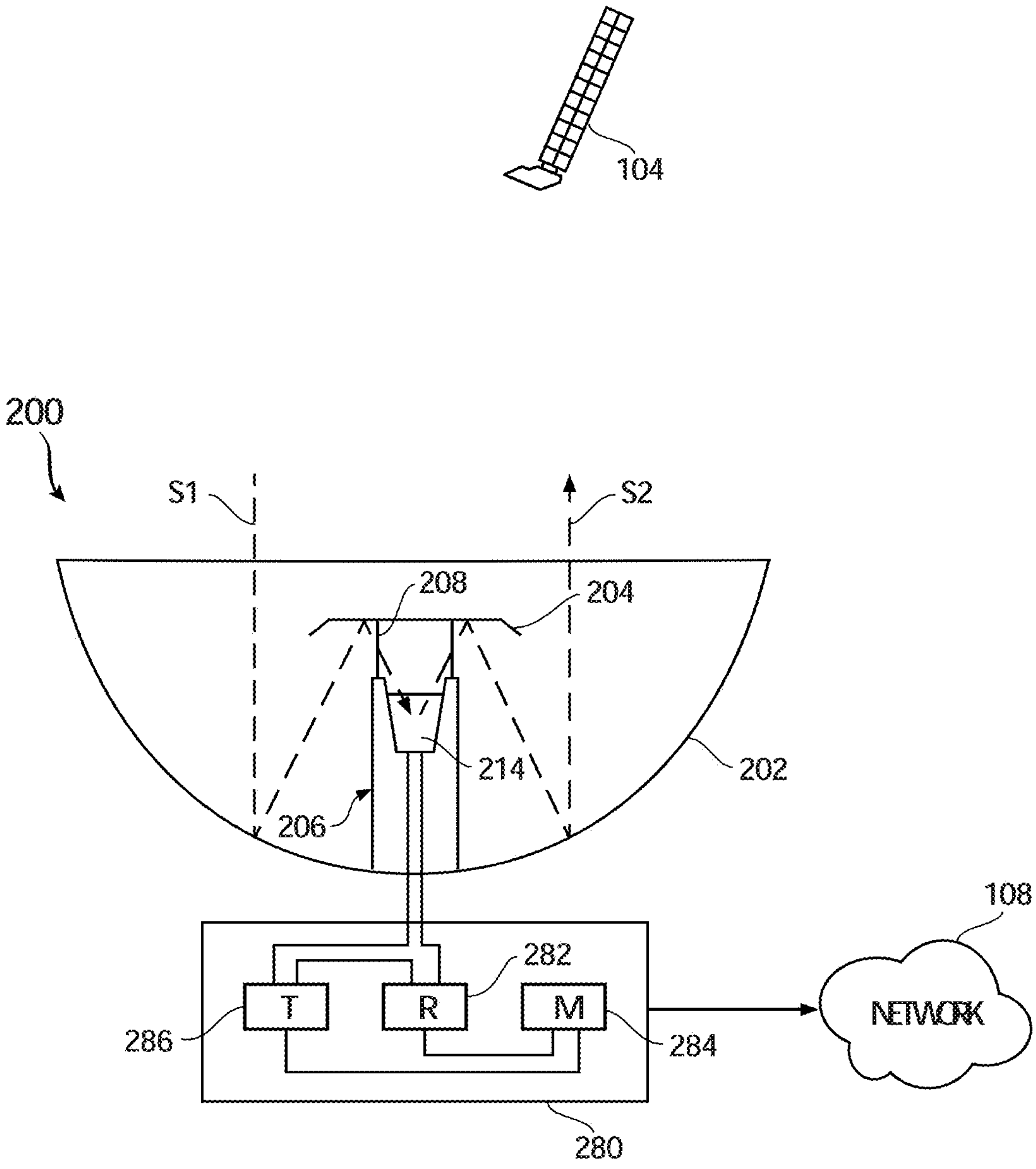
FIG. 3 illustrates a schematic side view of an antenna assembly illustrating exemplary signal travel paths in accordance with embodiments of the present disclosure.

Referring to FIG. 3, signal travel paths in an exemplary dual reflector antenna assembly 200 will now be described. As seen in FIG. 3, satellite 104 can transmit a signal S1 to the antenna assembly 200. The signal S1 reflects off of the main reflector 202 and is directed to the sub-reflector 204. The sub-reflector 204 is configured to reflect the signal S1 to the horn 214. The horn 214 receives the signal S1 and communicates the signal S1 through a waveguide 280 to a receive module 282. The receive module 282 provides the signal S1 to a modem 284 that can convert the signal into appropriately formatted data for transmission to the ground network 108 (see FIG. 1) such as the Internet.

Likewise, signals received from the ground network 108 can be sent via the modem 284 to a transmit module 286. A signal S2 generated by the transmit module 286 is passed through the waveguide 280 to the horn 214, then transmitted by the horn 214 to the sub-reflector 204, which reflects the signal S2 to the main reflector 202, which then reflects the signal S2 towards the satellite 104.

Figure 4:
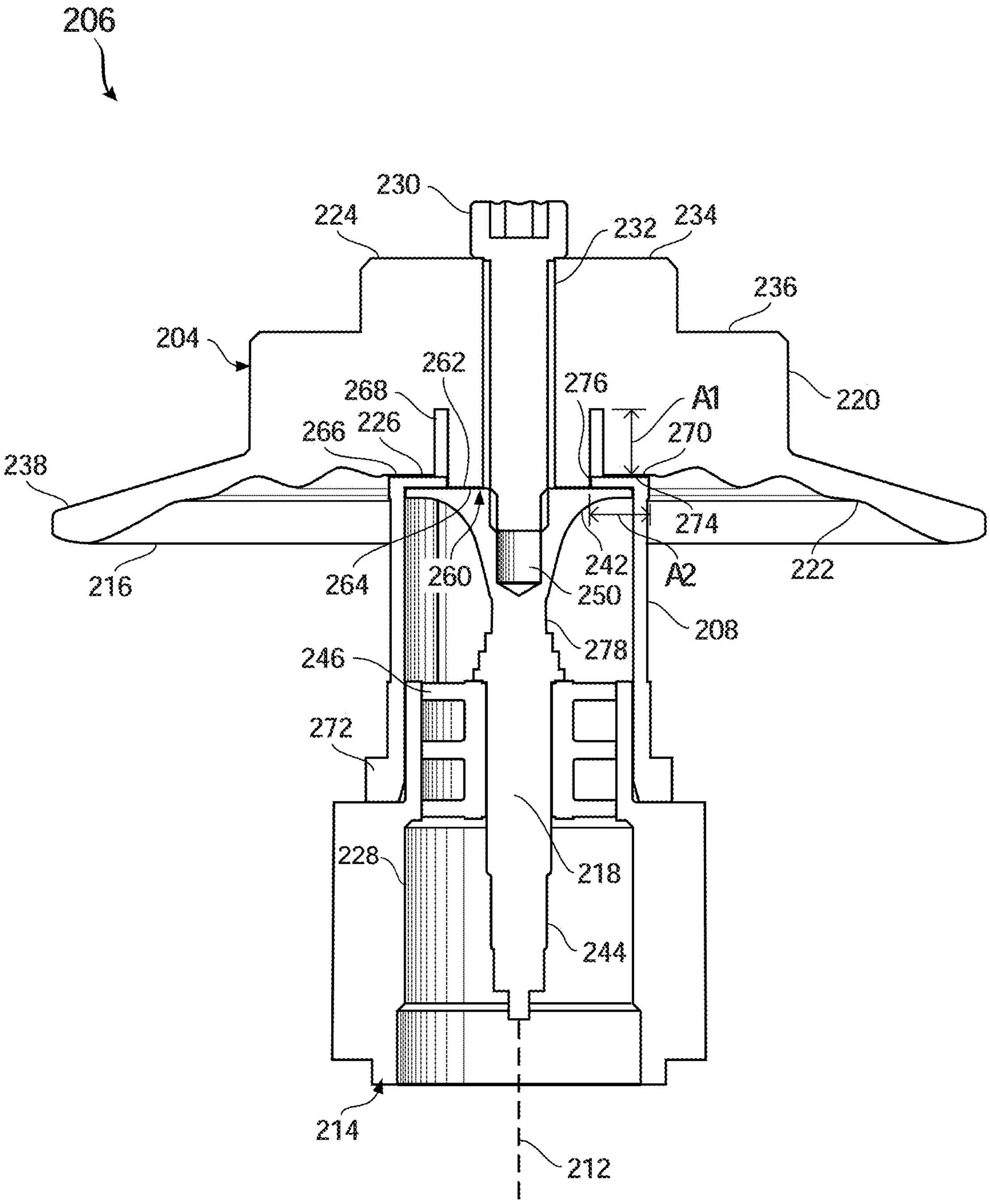
FIG. 4 illustrates a feed system including a horn, a dielectric portion, and a sub-reflector in accordance with one embodiment of the present disclosure.

Referring to FIG. 4, a feed system 206 in accordance with one embodiment of the present disclosure is provided, which includes mechanical attachment between first and second components of the sub-reflector 204 to provide a structure for coupling with a dielectric portion 208.

Suitable fastener assemblies in accordance with embodiments of the present disclosure may include any mechanical attachment components between components of the sub-reflector 204 and/or the dielectric portion 208, such as one or more fasteners screws, bolts, snap fit, and/or interference fit attachment mechanisms. Such fastener assemblies may include an adhesive attachment in addition to a mechanical attachment component. In accordance with embodiments of the present disclosure, suitable fastener assemblies provide a reliable attachment mechanism under extreme thermal cycling, for example, between −100° C. and 120° C. or other ranges experienced in outer space applications, and/or under vibration impact forces, for example, in a spacecraft launch scenario.

Figure 6:
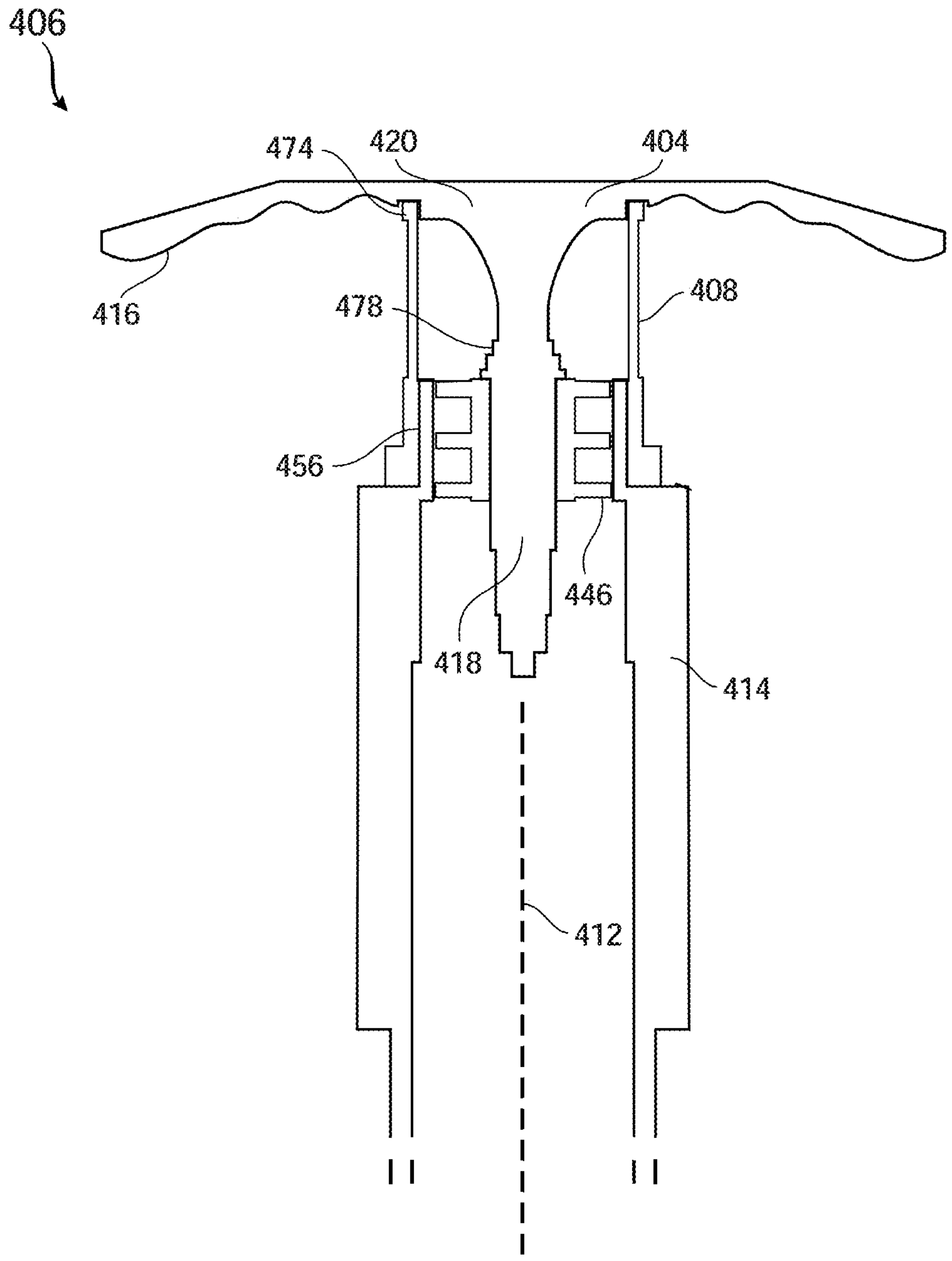
FIG. 6 illustrates a feed system including a horn, a dielectric portion, and a sub-reflector in accordance with previously developed technology.

In previously designed antenna assemblies, components of the feed system were bonded at specific bonding points (see, e.g., the feed system of FIG. 6). The bonded joints can introduce mechanical and thermal constraints. For example, in outer space applications, extreme thermal cycling can cause bond failure due to a mismatch in the coefficient of thermal expansion (CTE) of the materials that are bonded to each other (such as dielectric and metal materials). Likewise, system vibrations, for example, during a launch event can affect such bonded joints. Further, bonded joints can add process control requirements to the antenna assembly, such as storage, substrate preparation for the bonding material, dispensing of the bonding, curing, proof loading and disposal.

Referring to FIG. 4, a feed system 206 designed in accordance with embodiments of the present disclosure will now be described. FIG. 4 is a side cross-sectional view of an embodiment of a feed system 206 in an antenna assembly 200. Some components of the feed system 206 include a sub-reflector assembly 204, a waveguide horn 214 extending from the main reflector 202, and a dielectric portion 208 extending from the distal end of the feed assembly 206 to support the sub-reflector 204.

The main reflector 202 is generally concave (see FIGS. 2A and 2B) to form a predetermined focal region 210. In the embodiment shown in FIGS. 2A and 2B, the main reflector 202 has a generally parabolic surface of revolution about an axis of symmetry 212 that may be aligned with, or parallel to the parabola axis. Alternatively, the main reflector 202 could have any of a variety of cross-sections, including spherical or trough-shaped.

In the illustrated embodiment, the feed assembly 206 of the antenna assembly 200 includes a waveguide horn 214 extending from the main reflector 202 concentric with the axis 212 of the main reflector 202. In general, all of the elements of the antenna are concentric about axis 212 in the embodiment shown. However, non-concentricity is within the scope of the present disclosure. The sub-reflector 204 is mounted beyond the distal end of the waveguide horn 214, and is typically positioned in the focal region 210 of the main reflector 202.

In one aspect, a feed excitation signal of the antenna assembly 200 can be a dual-circularly polarized signal in that it can transition signals from circular polarization to a coaxial waveguide at the feed system 206. The feed system 206 can be designed to select the polarization of the waves to be received, which helps to attenuate unwanted signals. The selected polarization of the waves can be either horizontal or vertical if the polarization is linear, or clockwise or counterclockwise (also called left- and right-handed) if the polarization is circular. Certain devices can also allow the feed system 206 to accept both linear and circular polarizations, although such configuration may result in an insertion loss to all incoming signals.

When used with a parabolic reflector 202, a phase center of the waveguide horn 214 is usually placed at the system focus 210 of the main reflector 202 or sub-reflector 204. In some embodiments, a ring caustic can be defined to represent a ring of points through which the electromagnetic waves travel between the main reflector 202 and the sub-reflector 204.

The sub-reflector 204 of the illustrated embodiment of FIG. 4 includes a body portion 220 and a stem portion 218. The body portion 220 and the stem portion 218 each have respective interior bores 232 and 250 to aid in attachment of the body portion 220 with the stem portion 218, as described in greater detail below. Other attachment designs are also within the scope of the present disclosure, as described in greater detail below.

In the illustrated embodiment, the body portion 220 has a first end and second end 224 and 226, and includes first and second stepped portions 234 and 236 and a flange portion 238 extending from the second stepped portion 236. The stepped portions 234 and 236 are defined to reinforce the interior bore 232 and for ease of manufacturing. The sizing of the stepped portions 234 and 236 can depend on design parameters for the feed system 206. The flange portion 238 includes at least a portion of the reflecting portion 216 of the sub-reflector 204.

The reflecting portion 216 includes a contoured reflecting surface 222 on the undersurfaces of the body portion 220 extending to the flange portion 238. The contoured reflecting surface 222, as an under surface of the sub-reflector 204, faces the surface of the main reflector 202. The contoured reflecting surface 222 may be a radially-symmetrical contoured surface, with contours designed to enhance antenna performance. Although shown with a particular contour in the FIG. 4, other contours are within the scope of the present disclosure. The reflecting portion 216 also includes an outer surface 278 on the stem portion 218 of the sub-reflector 204.

Reflecting surfaces 222 and 278 of the main body 220 and the stem portion 218 of the sub-reflector 204 are designed to be reflective. Accordingly, the main body 220 and the stem portion 218 may be made from metal, such as aluminum or other suitable metals or metal alloys, or may be plated with metal, for example, plastic plated with aluminum. In addition, the reflecting surfaces 222 and 278 may be conductive.

The contoured profile of the contoured reflecting surfaces 222 and 278 of the under surface of the body portion 220 and the stem portion 218 can be created by fitting a spline (or a special function defined piecewise by polynomials that is used for data interpolation or smoothing) to a set of control points that are defined by the configuration of the feed system 206. Along with other features, the position of these points can be adjusted during optimization of the structure to meet a prescribed side lobe mask, as well as gain and return loss objectives associated with the electromagnetic signals S1 and S2 (see FIG. 3) to be transmitted and/or received by the feed system 206.

At the second end 226 of the body portion 220 of the sub-reflector 204, adjacent the interior bore 232, the body portion 220 is configured to couple with the dielectric portion 208 and the stem portion 218 at a coupling interface 260. In the illustrated embodiment, the body portion 220 includes an extending portion 264, which is shown as being configured to interface with the stem portion 218. In addition, the body portion 220 includes an intermediate portion 266, which is shown as being configured to interface with the dielectric portion 208.

At or near the coupling interface 260, the body portion 220 includes an inwardly extending channel 268, which may function as a portion of a choke, as described in greater detail below. In the illustrated embodiment, the inwardly extending channel 268 is disposed on the body portion 220 extending inwardly from the second end 226 between the extending portion 264 and the intermediate portion 266. However, other configurations are also within the scope of the present disclosure.

In the illustrated embodiment, the channel 268 is adjacent a collar portion 274 of the dielectric portion 208, which may also function as a portion of the choke, as described in greater detail below. In the illustrated embodiment, the channel 268 is an axial portion of the choke, and the collar portion 274 is a radial portion of the choke.

The stem portion 218 of the sub-reflector 204 includes a first end 242 and a second end 244. At least a portion of the stem portion 218 is configured to be received within the dielectric portion 208, which is described in greater detail below.

The body portion 220 and the stem portion 218 are configured to be couplable to one another. In the illustrated embodiment, the body portion 220 and the stem portion 218 are couplable by a fastener 230. In the illustrated embodiment of FIG. 4, the fastener 230 is shown as a screw extending through the interior bore 232 of the body portion 220 into an interior bore 250 at the first end 242 of the stem portion 218. The length of the fastener 230 can depend on design parameters for the feed system 206.

The reflective surfaces of the sub-reflector 204 (such as under surface 222 and stem outer surface 278) are typically made of reflective and conductive materials, such as metal parts or metal plating. However, the fastener can be made from any material. In one embodiment, there may be a conductive path between the main body 220 and the stem portion 218, for example, at the interface 260 between the main body 220 and the stem portion 218. In another embodiment, no conductive path is needed. In yet another embodiment, the main body 220 and the stem portion 218 need not be in contact at the interface 260.

Figure 5:
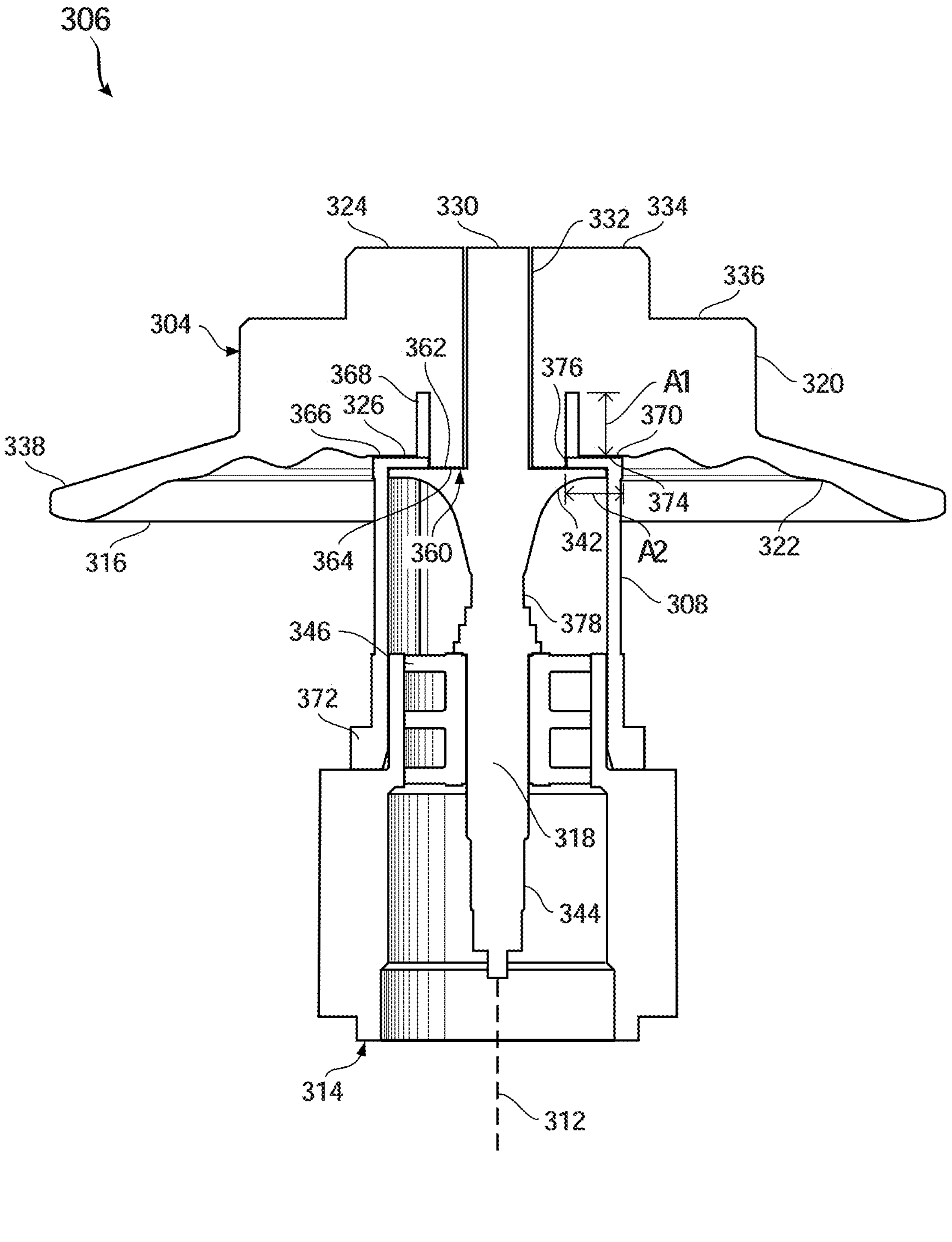
FIG. 5 illustrates a feed system including a horn, a dielectric portion, and a sub-reflector in accordance with another embodiment of the present disclosure.

In another embodiment, the fastener may be an extending portion from the stem portion designed for a snap fit or an interference fit with the reflecting portion. For example, see an alternate embodiment shown and described with reference to FIG. 5. The embodiment of FIG. is substantially similar to the embodiment of FIG. 4 except for differences regarding the fastener 330. Like parts in the embodiment of FIG. 5 are numbered similarly to those in the embodiment of FIG. 4, but in the 300 series.

Returning to FIG. 4, at the first end 242, the stem portion 218 includes a first end surface 262 for interfacing with the dielectric portion 208 and the body portion 220. In the illustrated embodiment, the first end surface 262 is shown as a planar surface. However, a contoured surface or a surface having a different configuration than a planar surface may be within the scope of the present disclosure. In the illustrated embodiment, a portion of the first end surface 262 is designed for interfacing with an interior collar 274 of the dielectric portion 208 and another portion of the first end surface 262 is designed for interfacing with the extending portion 264 of the sub-reflector 204, as described in greater detail below.

Extending from the first end 242 to the second end 244, the stem portion 218 includes a reflective surface 278. From the first end 242 toward the second end 244 of the stem portion 218, the reflective surface 278 is contoured. When coupled to the body portion 220, the contoured reflective surface 278 of the stem portion 218 defines a portion of the reflecting surface 216 of the sub-reflector 204, as described in greater detail below.

Toward the second end 244, the stem portion 218 is designed and configured to be received by bobbin 246. In the illustrated embodiment, bobbin 246 is disposed within the internal bore 228 of the horn 214 to surround the stem portion 218 and maintain the sub-reflector assembly 204 in a fixed position relative to the dielectric portion 208 to maintain concentricity. In the illustrated embodiment, the bobbin 246 is a spindle or cylinder with flanges. Three flanges are shown in the structure of the bobbin 246 but the number of flanges is not restrictive and can be more or less than three. In an alternate embodiment, the bobbin 246 may be disposed within the dielectric portion 208. The bobbin 246 may be made from any suitable materials, including dielectric materials similar to the dielectric portion 208.

The dielectric portion 208 physically supports the sub-reflector 204 at the distal end of the feed system 206 without interfering with radio frequency signals. The dielectric portion 208 can be made of any suitable dielectric material having suitable mechanical properties, such as any of a variety of ceramics or plastics. As non-limiting examples, the dielectric portion 208 may be made from plastic materials such as polyether ether ketone (PEEK), polyetherimide (PEI), or any other suitable dielectric material. The dielectric portion 208 may also receive a surface treatment, to reduce the surface resistivity and to mitigate charge build-up on the sub-reflector 204. As a non-limiting example, a suitable surface treatment may be an ion-beam surface treatment technology, such as that under the trade name CARBOSURF™. In one example, a target surface resistivity for the dielectric portion 208 may be in the range of 1E6 to 1E9 ohm/square.

In the illustrated embodiment, the dielectric portion 208 has a first end 270 and a second end 272. As discussed above, the first end 270 of the dielectric portion 208 is designed for interfacing with both the body portion 220 of the sub-reflector 204 and the stem portion 218 at interface 260. In the illustrated embodiment, the first end 270 of the dielectric portion 208 is shown as including a collar 274. In the illustrated embodiment, the collar 274 is an inwardly extending collar defining an opening 276 therein. However, in other embodiments, the collar may be designed to be outwardly extending or in other configurations to interface with components of the sub-reflector 204. In one embodiment of the present disclosure, the dielectric portion is a tubular portion having a diameter of less than 2.5λ, wherein λ is a wavelength of signals processed by the feed system 206. In some embodiments, the diameter of the dielectric portion may be about 1.0λ, for example, +/− up to 20% or +/− up to 30%. The diameter may be less at a low frequency and higher at a highest frequency.

In the illustrated embodiment, the sub-reflector extends out with a larger outer diameter than the dielectric portion. In some embodiments, the sub-reflector diameter may be about 2.5λ, for example, +/− up to 20% or +/− up to 30%, and for example, at or near 2.5λ a lowest frequency of operation. The sub-reflector diameter is subject to optimization to meet certain objectives for gain and side lobe performance.

At the first end 270 of the dielectric portion 208, the collar 274 is disposed between the intermediate portion 266 of the body portion 220 and the first end surface 262 of the stem portion 218. The extending portion 266 of the body portion 220 is received within the opening 276 of the collar 274.

For ease of assembly, the outer edge of the first end surface 262 of the stem portion 218 may have an interference fit with the inner wall of the dielectric portion 208 adjacent the collar 274. Likewise, the extending portion 266 of the body portion 220 may have an interference fit with the opening 276 of the collar 274. In that regard, for temporary assembly, the stem portion 218 may be placed within the dielectric portion 208, and the body portion 220 may be attached to the dielectric portion 208. With these parts in place, fastener 230 can be used to secure the body portion 220 to the stem portion 218, thereby clamping the collar 274 of the dielectric portion 208 between the second end 226 of the body portion 220 and the first end 242 of the stem portion 218.

The second end 272 of the dielectric portion 208 can connect the horn 214 to the sub-reflector 204. In the illustrated embodiment, such connection is shown by an interference fit.

As mentioned above, the dielectric portion 208 can be used for supporting and spacing the sub-reflector 204 in its connection to the feed system 206.

As mentioned above, at or near the interface 260 of the dielectric portion 208 and the sub-reflector 204, the sub-reflector 204 includes an inwardly extending channel 268 defining a first portion of a choke for providing virtual continuity at the reflecting surface 216 of the sub-reflector 204. In the illustrated embodiment, the channel 268 is an axially-symmetric channel having a cylindrical shape surrounding axis 212 and extending through at least a portion of the body portion 220 of the sub-reflector 204. In another embodiment, the channel may have a different structure that is not symmetric along axis 212.

A length of the axially-symmetric channel 268 along axis 212 can be determined as a multiple of a wavelength of electromagnetic signals (signals S1 and S2 shown in FIG. 2A) transmitted or received by the feed system 206. The height of the axially-symmetric channel 268 can vary depending on the frequency band being received by the feed system 206. Thus, the physical configuration of the axially-symmetric channel can vary based on the wavelength of signals passed by the feed system 206. For example, the height of the axially-symmetric channel 268 can be λ/4 +/− up to 20% or +/− up to 30% (as indicated by dimensional arrow A1), wherein λ is a wavelength of signals processed by the feed system 206. In one embodiment, the width of the channel may be about 20% of the height of the channel, within a range of +/− up to 20% or +/− up to 30%.

A second portion of the choke may be formed by the dimension of the dielectric material of the collar portion 274 disposed between the stem portion 218 and the main body 220 of the sub-reflector 204, may be λ/4 +/− up to 20% or +/− up to 30% (as indicated by dimensional arrow A2), wherein λ is a wavelength of signals processed by the feed system 206. The dimension of the collar portion 274 may be scaled with the square root of the dielectric constant. Hence, in the illustrated embodiment of FIG. 4, A2 is shorter than A1.

Together, the channel 268 and the collar portion 274 form the choke, which may have a total sum of λ/2 +/− up to 20% or +/− up to 30% (as indicated by the summation of dimensional arrows A1 and A2), wherein λ is a wavelength of signals processed by the feed system 206.

A short is an electrical circuit that allows a current to travel along an unintended path with no or very low electrical impedance. A short results in excessive current flowing through the circuit. In accordance with embodiments of the present disclosure, the choke (defined by channel 268 and collar portion 274) operates as a virtual short. From an electrical perspective, the virtual short with no or very low electrical impedance creates virtual continuity in the reflective surface of the sub-reflector 204. Therefore, the non-continuous reflective surface extending from the contoured surface 278 of the stem portion 218 to the contoured surface of the under surface 222 of the sub-reflector 204 functions as if it is a continuous reflective surface for virtual continuity.

In one non-limiting example, the choke can support, for example, signals at approximately 23 GHz. In this regard, the structure of the axially-symmetric choke can have low impedance and cause the signals at or around 23 GHz to reflect off the sub-reflector 204. As a non-limiting example, any suitable broadband is within the scope of the present disclosure.

Referring to FIG. 6 is a previously designed feed system 406, the dielectric portion 408 is coupled to a single-part sub-reflector 404. The single-part sub-reflector 404 has a substantially continuous reflective surface extending from the contoured surface 478 of the stem portion 418 to the contoured surface of the reflecting portion 416 of the sub-reflector 404. Because there is no dielectric material disposed between the stem portion 418 and the main body 420 of the sub-reflector 404 (which would create a non-continuous reflective surface), no choke is needed.

To maintain a substantially continuous reflective surface, the attachment interface 474 for the dielectric portion 408 and the sub-reflector 404 is sized to be very small, and not large enough for a secure interference fit. In that regard, the interface for a secure interference fit would likely have a comparable or similar overlapping dimension as the diameter of the dielectric portion 408 (similar to the overlapping interface 456 between the dielectric portion 408 and the waveguide horn 414). However, such sizing of interface 474 would significantly affect performance. Accordingly, adhesive is used to secure the attachment between the dielectric portion 408 and the sub-reflector 404, which may result in burdensome process control requirements as noted above.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" refers to at least one of a set and indicates that one member of the set or multiple members of the set satisfy the claim. For example, claim language reciting "at least one of A and B" means A, B, or A and B.

What is claimed is:

1. A parabolic antenna assembly, comprising:

a main reflector;

a feed system in RF communication with the main reflector and including a horn and a dielectric portion; and a sub-reflector in RF communication with the feed assembly, wherein the sub-reflector includes a body portion and a stem portion mechanically coupled to one another, wherein the body portion extends from a first end to a second end and defines a channel extending therein from the second end, wherein a reflecting surface of the sub-reflector is defined by at least a portion of the body portion and at least a portion of the stem portion, wherein the dielectric portion spaces the sub-reflector from the horn, and wherein the sub-reflector includes an axially-symmetric choke for providing virtual continuity at the reflecting surface, and wherein the channel defines at least a first portion of the axially-symmetric choke.

2. The parabolic antenna assembly of claim 1, wherein at least a portion of the stem portion of the sub-reflector is disposed within the dielectric portion.

3. The parabolic antenna assembly of claim 1, wherein the body portion and the stem portion of the sub-reflector are mechanically coupled by one or more of a screw, a snap fit, or an interference fit.

4. The parabolic antenna assembly of claim 1, wherein at least one of the body portion and the stem portion of the sub-reflector include an internal bore for mechanical coupling.

5. The parabolic antenna assembly of claim 1, further comprising a bobbin disposed within the feed system and configured to support the stem portion of the sub-reflector.

6. The parabolic antenna assembly of claim 1, wherein the reflecting surface of the sub-reflector is made from metal.

7. The parabolic antenna assembly of claim 1, wherein the body portion and the stem portion, when coupled, are configured to provide a conductive path there-between.

8. The parabolic antenna assembly of claim 1, wherein the stem portion has a first end in contact with a first portion of the second end of the body portion.

9. The parabolic antenna assembly of claim 8, wherein the second end of the body portion includes an extending section in contact with the first end of the stem portion.

10. The parabolic antenna assembly of claim 8, wherein the dielectric portion has a first end in contact with a second portion of the second end of the body portion of the sub-reflector.

11. The parabolic antenna assembly of claim 10 wherein the dielectric portion includes an internal collar at the first end defining an opening therein.

12. A parabolic antenna assembly, comprising:

a main reflector;

a feed system in RF communication with the main reflector and including a horn and a dielectric portion; and a sub-reflector in RF communication with the feed assembly, wherein the sub-reflector includes a body portion and a stem portion mechanically coupled to one another, wherein a reflecting surface of the sub-reflector is defined by at least a portion of the body portion and at least a portion of the stem portion, wherein the dielectric portion spaces the sub-reflector from the horn, wherein the sub-reflector includes an axially-symmetric choke for providing virtual continuity at the reflecting surface, wherein the dielectric portion has a first end in contact with the body portion of the sub-reflector, wherein the dielectric portion includes an internal collar at the first end defining an opening therein, and wherein an extending portion of the body portion is received within the opening in the dielectric portion.

13. The parabolic antenna assembly of claim 12, wherein the stem portion has a first end in contact with the collar at the first end of the dielectric portion and the extending portion of the body portion.

14. The parabolic antenna assembly of claim 1, wherein the axially-symmetric choke includes the first choke portion and a second choke portion.

15. The parabolic antenna assembly of claim 14, wherein the axially-symmetric choke has a combined length of approximately $\lambda/2$ +/− up to 30%, wherein $\lambda$ is a wavelength of an electromagnetic signal.

16. The parabolic antenna assembly of claim 14, wherein the first choke portion is an axial choke portion and the second choke portion is a radial choke portion.

17. The parabolic antenna assembly of claim 14, wherein the first choke portion has a length of approximately $\lambda/4$ +/− up to 30%, wherein $\lambda$ is a wavelength of an electromagnetic signal.

18. The parabolic antenna assembly of claim 14, wherein the second choke portion has a length of approximately $\lambda/4$ +/− up to 30%, wherein $\lambda$ is a wavelength of an electromagnetic signal.

19. A parabolic antenna assembly, comprising:

a main reflector;

a feed system in RF communication with the main reflector including a horn and a dielectric portion; and a sub-reflector in RF communication with the feed assembly, wherein the sub-reflector includes a body portion and a stem portion mechanically coupled to one another, wherein the body portion extends from a first end to a second end and defines a channel extending therein from the second end, wherein a reflecting surface of the sub-reflector is defined by at least a portion of the body portion and at least a portion of the stem portion, wherein the dielectric portion spaces the sub-reflector from the horn, and wherein the sub-reflector includes an axially-symmetric choke for providing virtual continuity at the reflecting surface, wherein the axially-symmetric choke includes a first axial choke portion and a second radial choke portion having a combined length of approximately $\lambda/2$ +/− up to 30%, wherein $\lambda$ is a wavelength of an electromagnetic signal, wherein the first choke portion is defined by the channel and has a length of approximately $\lambda/4$ +/− up to 30% and the second choke portion has a length of approximately $\lambda/4$ +/− up to 30%.

* * * * *